US006874296B2

(12) United States Patent
Bachand et al.

(10) Patent No.: US 6,874,296 B2
(45) Date of Patent: Apr. 5, 2005

(54) LABELLESS, ROLLED FOOD ITEM AND ITS FABRICATION

(75) Inventors: Gary S. Bachand, Marion, IA (US); Soumya Roy, Plymouth, MN (US); Jeffrey A. Taylor, Eden Prairie, MN (US); Craig E. Zimmermann, Waconia, MN (US)

(73) Assignee: General Mills, Inc., Golden Valley, MN (US)

( * ) Notice: Subject to any disclaimer, the term of this patent is extended or adjusted under 35 U.S.C. 154(b) by 0 days.

(21) Appl. No.: 10/761,118

(22) Filed: Jan. 20, 2004

(65) Prior Publication Data

US 2004/0151800 A1 Aug. 5, 2004

Related U.S. Application Data

(62) Division of application No. 09/150,692, filed on Sep. 10, 1998, now abandoned.

(51) Int. Cl.[7] .............................................. B65B 63/04
(52) U.S. Cl. ....................... 53/118; 53/111 R; 99/450.2
(58) Field of Search ........................ 53/431, 430, 113, 53/116–118, 111 R, 157; 99/450.1, 450.2; 425/391; 426/420, 501, 517; 118/13, 23, 32

(56) References Cited

U.S. PATENT DOCUMENTS

| 3,596,428 A | 8/1971 | Young et al. |
| 3,669,007 A | 6/1972 | Pulici |
| 4,352,825 A | 10/1982 | Cherukuri et al. |
| 4,516,487 A | 5/1985 | Madison et al. |
| 4,847,098 A | 7/1989 | Langler |
| 4,853,236 A | 8/1989 | Langler |
| 4,882,175 A | 11/1989 | Ream et al. |
| 4,994,293 A | * 2/1991 | Hayashi ...................... 426/501 |
| 5,205,106 A | 4/1993 | Zimmermann et al. |
| 5,263,407 A | 11/1993 | Pomara, Jr. |
| 5,284,667 A | 2/1994 | Zimmermann et al. |
| 5,455,053 A | 10/1995 | Zimmermann et al. |
| 5,514,397 A | 5/1996 | Shapiro |
| 5,640,897 A | * 6/1997 | Fehr .......................... 99/450.1 |
| 5,723,163 A | 3/1998 | Zimmermann et al. |
| 5,853,836 A | 12/1998 | Zoss |
| 6,153,233 A | * 11/2000 | Gordon et al. .............. 426/420 |
| 6,200,617 B1 | 3/2001 | Babiarz et al. |

FOREIGN PATENT DOCUMENTS

| GB | 2059858 A | * 4/1981 | .......... B29D/23/12 |
| WO | WO 84/04081 | * 10/1984 | .......... B65B/25/02 |
| WO | WO97/33822 | 9/1997 | |

* cited by examiner

Primary Examiner—Stephen F. Gerrity
(74) Attorney, Agent, or Firm—John A. O'Toole; Alan D. Kamrath; Douglas J. Taylor

(57) ABSTRACT

A rolled food item (110) is fabricated by rolling a strip of support material (16) and food (14) about its leading end (136) into a roll. Prior to its rolling into the roll, a deposit (144) of water is sprayed onto the food (14) adjacent to the trailing end (138) to increase the tackiness of the food (14) sufficient to be adherable to the support material (16) in the roll to at least temporarily prevent unintentional unrolling of the roll during later fabrication operations. In the preferred form, the trailing end of the deposit (144) is coextensive with the trailing end (138) of the strip of support material (16) and food (14). In one form, the side edges of the deposit (144) are spaced inwardly from the side edges of the food (14) which are spaced inwardly from the side edges of the support material (16).

3 Claims, 2 Drawing Sheets

LABELLESS, ROLLED FOOD ITEM AND ITS FABRICATION

CROSS-REFERENCE TO RELATED APPLICATION

This application is a division of U.S. patent application Ser. No. 09/150,692 filed Sep. 10, 1998 (now abandoned).

BACKGROUND

The present invention generally relates to food items, particularly to rolled food items, more particularly to coils of food supported on support material, and specifically to rolled food items or the like at least temporarily retained in a coiled condition without the use of a label during its fabrication.

The sale of snack-type food products is a highly competitive business. In addition to the particular food components, increasingly the novelty and play value of the product are important in the marketability of any particular food item. For example, fruit-based snack products such as FRUIT ROLL-UPS™ fruit products have found wide market acceptance. Likewise, U.S. Pat. No. 4,882,175 recognized the enhanced marketability of chewing gum in the form of a rolled-up tape allowing the consumer the chance to break off the desired size of piece to chew, saving the rest for later.

Many foods such as dehydrated fruit puree do not lend themselves to forming rolled food items such as where the food is in a strip of a thinness generally requiring external support and/or where the food tends to stick to itself such that it creates a single mass which can not be unrolled. In such cases, support material and food supported thereon are rolled into a coil creating a novelty form of merchandising for that food. For example, FRUIT BY THE FOOT™ fruit products of the type disclosed in U.S. Pat. Nos. 5,455,053 and 5,723,163 have enhanced play value which is believed to promote the marketability thereof.

During the fabrication of rolled food items, provisions have to be made to prevent the food item from unrolling during fabrication such as in the wrapping and other packaging operations. A prior preferred method to prevent undesired unrolling is the application of a label extending over the trailing edge of the support material. In addition to its functional aspects, the labels used to hold the rolled food items in a coiled condition can add to the novelty and play value of the rolled food item. Particularly, the label often includes graphics which are visually appealing to the typical consumer of the food of the rolled food item and/or which promote the future purchase of the rolled food item. However, problems arose from the labels which had not been appropriately discarded after their removal from the rolled food item being difficult to remove when adhered to surfaces such as desk tops. One solution to this problem was to provide novel labels for such rolled food items such as of the type disclosed in U.S. Pat. No. 5,853,836, which is hereby incorporated herein by reference.

Another prior method to prevent unintentional unrolling is to utilize an edible adhesive such as corn syrup. However, corn syrup and similar adhesives have certain negatives including being an additive to the food which could affect its taste, texture, and/or appearance, being messy while eating and also during application and fabrication and being generally difficult to work with.

Accordingly, it is an object of the present invention to provide novel apparatus and methods for fabrication of a novel rolled food item which, in the preferred form, is retained at least temporarily in a coiled condition during fabrication such as in the wrapping and other packaging operations without the use of a label and which overcomes the negatives associated with the use of corn syrup and similar food adhesives.

Another object of the present invention is to allow the retention of the rolled food item in a coiled condition without the use of a label and without significant change to existing fabrication equipment and its operating conditions.

SUMMARY

Surprisingly, the above objectives and other problems can be satisfied in the field of rolled food items and their fabrication by providing, in the preferred form, a first portion of the food adjacent the trailing edge having a moisture content greater than the remaining portions of the food and sufficient to increase the tackiness of the food to be adherable to the support material to retain the support material and food in a roll and to at least temporarily prevent unintentional unrolling of the roll during fabrication of the rolled food item.

In the preferred form, the first portion of the food is formed by spraying a source of moisture, and in the most preferred form a food grade water free of adhesive type additives, onto the food adjacent to the trailing edge prior to its rolling into the roll.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
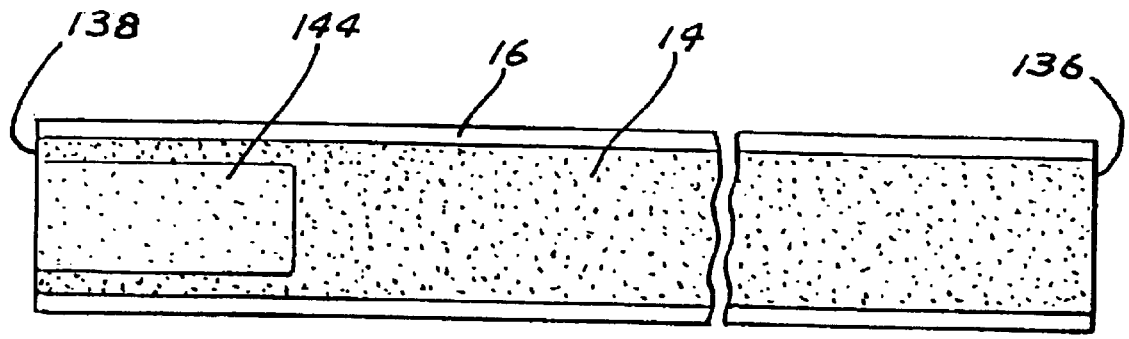
FIG. 1 shows a top plan view of a strip of support material and food according to the preferred teachings of the present invention, with portions broken away.
Figure 2:
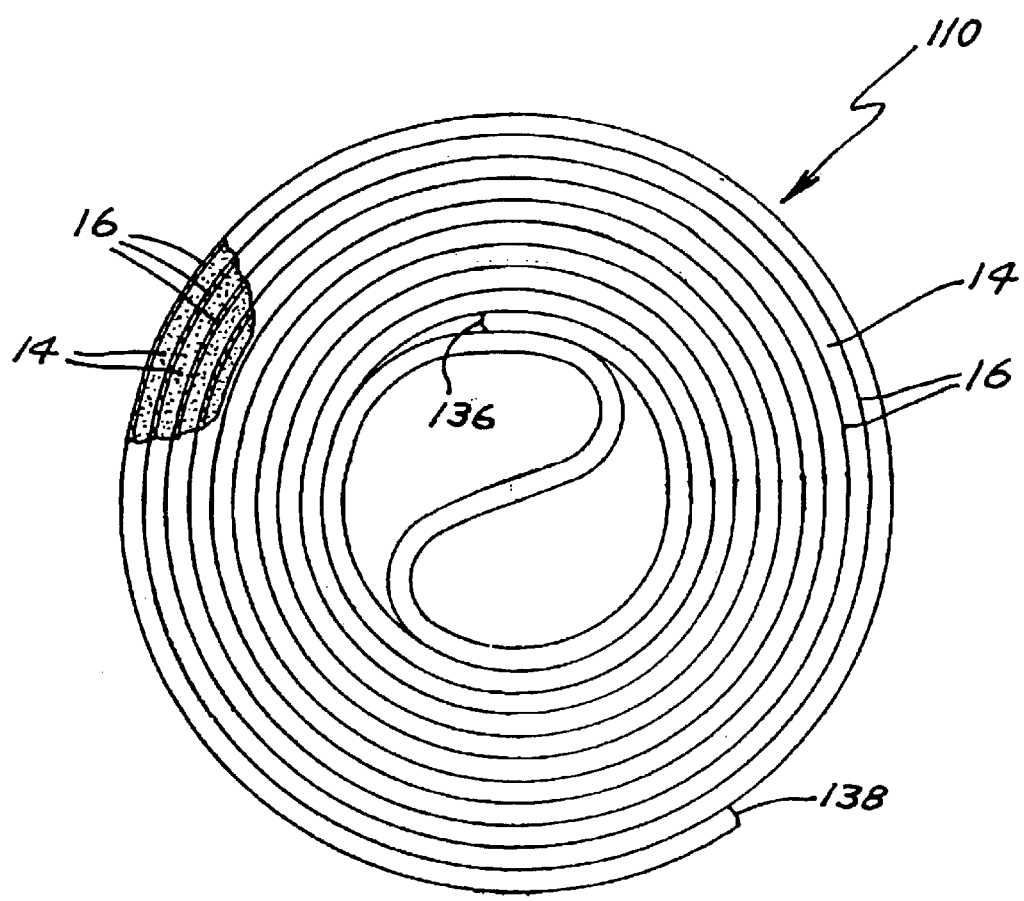
FIG. 2 shows a side elevational view of the strip of support material and food of FIG. 1 rolled into a roll to form a rolled food item.
Figure 3A:
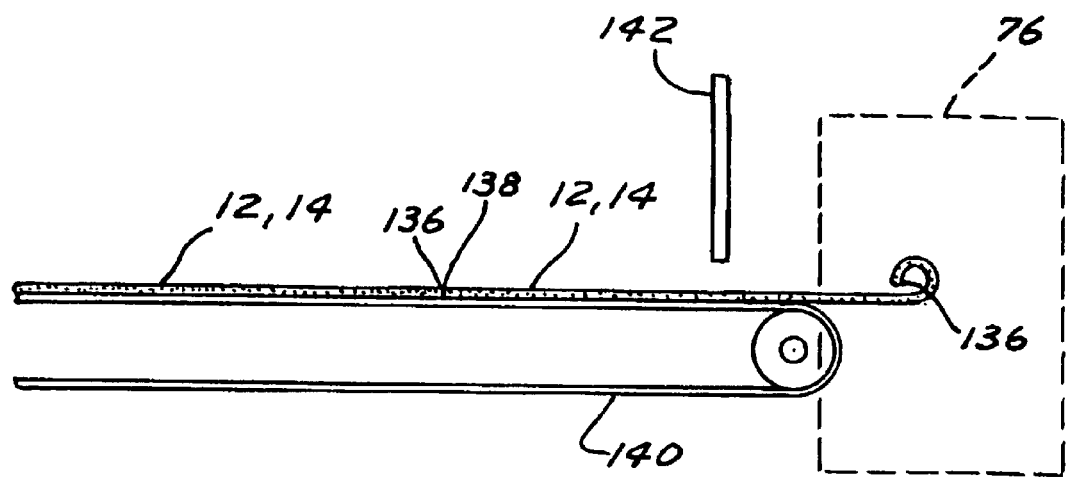
FIGS. 3a and 3b show diagramatic side elevational views of the apparatus for rolling the strip of support material and food of FIG. 1 to form the rolled food item of FIG. 2.
Figure 3B:
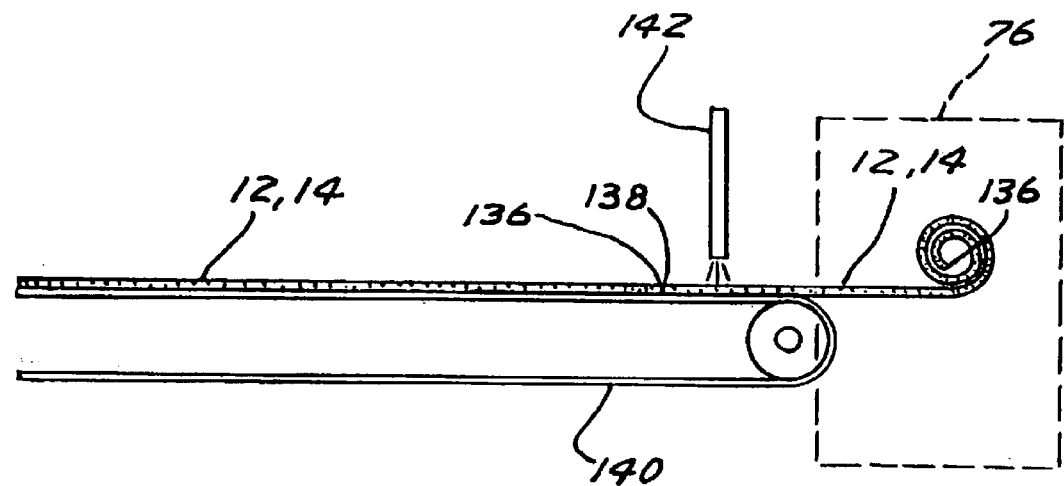

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "first", "second", "edge", "end", "transverse", "longitudinal", "width", "length", "height", "inner", "outer", "leading", "trailing", and similar terms are used herein, it should be understood that these terms have reference only to the structure shown in the drawings as it would appear to a person viewing the drawings and are utilized only to facilitate describing the illustrative embodiment.

DESCRIPTION

A rolled food item according to the preferred teachings of the present invention is shown in the drawings and generally designated 110. In the most preferred embodiment of the present invention, rolled food item 110 is an improvement of the type shown and described in U.S. Pat. Nos. 5,205,106; 5,284,667; 5,455,053 and 5,723,163. For purpose of explanation of the basic teachings of the present invention, the same numerals designate the same or similar parts in the present figures and the figures of U.S. Pat. Nos. 5,205,106; 5,284,667; 5,455,053 and 5,723,163. The description of the common numerals and rolled food item 110 may be found herein and in U.S. Pat. Nos. 5,205,106; 5,284,667; 5,455,053 and 5,723,163, which are hereby incorporated herein by reference.

Generally, rolled food item 110 includes strips of food 14 and support material 16 simultaneously rolled about its leading edge or end 136 into a coil. Food 14 is of a thinness requiring external support by support material 16. In the most preferred form, food 14 is a sweetened dehydrated fruit-based material typically referred to in the art as a fruit leather which can be derived from fruit purees and in the most preferred form is of the same type as utilized in the first, solid or "hard" portion or region of the dual textured food piece described in U.S. Pat. No. 4,847,098 issued Jul. 11, 1989 to J. E. Langler and in U.S. Pat. No. 4,853,236 issued Aug. 1, 1989 to J. E. Langler, each entitled Dual Textured Food Piece of Enhanced Stability and each of which is hereby incorporated herein by reference.

Support material 16 may be formed of any suitable material such as silicon parchment paper which has the necessary strength to support food 14 without tearing and without bulkiness to allow rolling of food 14 and support material 16 into a compact food piece and which allows food 14 to be easily separated therefrom for consumption.

In the preferred form, the strip of food 14 has side edges spaced inwardly from the side edges of the strip of support material 16 and in the most preferred form are spaced in the order of one sixteenth inch (1.6 mm) inwardly from the side edges of the strip of support material 16. Depending upon the method of fabrication, spacing the strip of food 14 inward of the side edges of the strip of support material 16 is advantageous as food 14 has less tendency to rub against the fabrication equipment which is undesirable as the side edges of the strip of food 14 could acquire an unsightly or otherwise undesirable appearance and as food 14 could build up or otherwise collect on the fabrication equipment requiring extra cleaning and maintenance. In the preferred form, the strip of food 14 does not extend beyond the leading end 136 and trailing edges or ends 138 of the strip of support material 16 and in the most preferred form has a length equal to the length of the strip of support material 16 so that leading and trailing ends 136 and 138 of the strip of food 14 are coextensive with leading and trailing ends 136 and 138 of the strip of support material 16. Specifically, in the most preferred form, the strips of food 14 and support material 16 are formed continuously and are simultaneously cut to length such as by a water knife. In the preferred form, the width of the strip of support material 16 is minimal relative to its length and in the most preferred form, the strip of support material 16 has a width in the order of one and one-eighth inch (2.9 cm) and a length in the order of 36 inches (1 meter).

The strips of food 14 and support material 16 are rolled around their leading edges or ends 136 into the coil having multiple rotations with the strip of support material 16 located on the outside of the roll or coil and with trailing edge 138 of the strips of food 14 and support material 16 located on the outside or periphery of the roll or coil. In the most preferred form, when the strips of food 14 and support material 16 are rolled, the periphery of the coil or roll is in the order of four and five-eighths inches (11.7 cm).

In the production of rolled food item 110, generally one or more strips of food 14 and support material 16 are transported in a generally planar condition such as on a conveyor 140 towards a roll-up section 76. It can be appreciated that strips of food 14 and support material 16 can be formed in a variety of manners according to the teachings of the present invention including but not limited to the type disclosed in U.S. Pat. Nos. 5,205,106; 5,284,667; 5,455,053 and 5,723,163. Similarly, roll-up section 76 can be of a variety of forms according to the teachings of the present invention including but not limited to the type utilizing a reciprocable, rotatable tuning fork disclosed in U.S. Pat. Nos. 5,205,106; 5,284,667; 5,455,053 and 5,723,163.

According to the teachings of the present invention, rather than providing a labeler and a label smasher as in U.S. Pat. Nos. 5,205,106; 5,284,667; 5,455,053 and 5,723,163, one or more spray nozzles 142 are provided vertically above and spaced from conveyor 140 and spaced in a manner to not physically contact the strips of food 14 and support material 16 on conveyor 140 and upstream of roll-up section 76. According to the teachings of the present invention, nozzles 142 spray a source of moisture in the preferred form of a liquid consisting of food grade water. In the preferred form, the water is free of adhesive type additives such as corn syrup and in the most preferred form is free of all additives.

In a preferred form, a fewer number of nozzles 142 are provided than the number of strips of food 14 and support material 16, with each nozzle 142 spraying a source of moisture over more than one strip of food 14 and support material 16. In this regard, four nozzles 142 could be provided to spray ten strips of food 14 and support material 16. In other forms, a separate nozzle 142 can be associated and transversely aligned with each strip of food 14 and support material 16. In such preferred forms, each nozzle 142 can have a spray pattern having a transverse width less than the width of the strip of support material 16, preferably less than the width of the strip of food 14, and most preferably approximately two thirds the width of the strip of food 14.

According to the teachings of the present invention, operation of each nozzle 142 is not continuous, but rather nozzles 142 spray a deposit 144 adjacent to trailing end 138 of the strips of food 14 and support material 16 and in the most preferred form with deposit 144 having a trailing end coextensive with the trailing end 138 of the strips of food 14 and support material 16, with deposit 144 extending upstream from trailing end 138. Deposit 144 which defines a first portion has a relatively short length considerably shorter than the remaining, second portion of the strips of food 14 and support material 16 and than the total elongated length of the strips of food 14 and support material 16, with deposit 144 in the most preferred form being generally 10% of the elongated length of the strips of food 14 and support material 16. In the preferred form shown, deposit 144 has side edges spaced inwardly from and parallel to the side edges of food 14. According to the teachings of the present invention, the remaining second portions of the strips of food 14 and support material 16 (other than deposit 144) are free of spray liquid. In this regard and in the most preferred form, air is blown through nozzles 142 after supply of the spray liquid has been terminated to nozzles 142 to remove any droplets of spray liquid that have remained in the tip of nozzles 142 to insure that such droplets fall in deposit 144 and not after leading edge 136 of the next strip of food 14 and support material 16.

Food 14 as processed during fabrication has a moisture content which enhances its shelf life, and particularly has a moisture content which does not result in food 14 undesirably degrading during normal storage times before consumption. With this moisture content, food 14 has a tackiness which may adhere to support material 16 when rolled into a roll but typically which is insufficient to prevent unintentional unrolling during further fabrication processes such as wrapping and other packaging operations. However, food 14 within deposit 144 has an increased moisture content so that food 14 becomes sticky or in other words has an increased tackiness sufficient to adhere to support material 16 in the roll to prevent unintentional unrolling of the roll at least temporarily during further fabrication processes. In the most preferred form, food 14 is fabricated in a continual process and has a constant consistency (aside from moisture content) between the leading and trailing ends 136 and 138. In this regard, food 14 itself adheres to support material 16 and specifically food 14 does not include an additive or adhesive which secures food 14 to support material 16.

The strips of food 14 and support material 16 including deposit 144 can be rolled in roll-up section 76 in the conventional manner so that support material 16 is located on the outside of the roll, trailing edge 138 is located on the periphery of the roll, and leading edge 136 is located adjacent the center of the roll and in the most preferred form, with the strip of support material 16 and food 14 being rolled around leading end 136 which is cut and into a roll having multiple rotations. According to the teachings of the present invention, deposit 144 will cause food 14 adjacent to trailing end 138 to adhere to support material 16 on the underlying wind of rolled food item 110 and specifically without requiring the use of a label. It should be appreciated that roll-up section 76 can include a pressure plate such as of the type disclosed in U.S. Pat. Nos. 5,205,106; 5,284,667; 5,455,053 and 5,723,163 to place pressure upon and to adhere food 14 of increased tackiness within deposit 144 to support material 16 to thus secure the strip of food 14 and support material 16 in a rolled or coiled condition during later fabrication steps such as in wrapping and other packaging operations.

The spray liquid should be applied by nozzles 142 in deposits 144 in an amount so that food 14 develops sufficient tackiness to be adherable to the strip of support material 16. Specifically, the adhesion of food 14 on support material 16 depends on the viscoelastic and the surface tension properties of food 14. Support material 16 is silicone coated in the most preferred form to achieve just enough cohesive bond between food 14 and support material 16, such that the former remains attached to the later during processing and storage. However, food 14 peels easily off support material 16 for consumption. Studies with adhesive-strength of synthetic films showed that the higher the wettability of the film, the greater the adhesive strength between the product and the film. The normal water activity of food 14 does not allow support material 16 (whose wettability has been reduced by silicone coating in the preferred form) to adhere to trailing edge 138 of food 14 during the formation of rolled food item 110. According to the teachings of the present invention, the water activity of food 14 within deposit 144 at trailing edge 138 was increased by the application of the spray liquid just before rolling in roll-up section 76. Because of the viscoelastic nature of food 14, the pressure applied in roll-up section 76 to trailing edge 138 of rolled food item 110 helps in the adhesion of deposit 144 of food 14 to the body of the roll. It was observed that too much moisture in food 14 also decreases the adhesion characteristics of food 14.

In this regard, a method was devised to measure the adhesion strength of the formed rolled food item 110. A texture analyzer, Model XT2, made by Stable Micro Systems, England was used for this purpose. The sample holder consisted of an aluminum rod hinged between two clamps, which in turn were attached to a wooden base. The whole assembly was attached to the texture analyzer in such a way that the rod is positioned horizontally, crossways to the operator, directly beneath the probe of the texture. analyzer. A sample rolled food item 110 was collected as soon as rolled food item 110 was formed in roll-up section 76. A 1.2 cm by 1.2 cm VELCRO sticky back square was gently taped to rolled food item 110 in such a way that trailing edge 138 of support material 16 aligns with an edge of the square. Rolled food item 110 was slipped into the aluminum rod and was placed in contact with the probe of texture analyzer already equipped with a complementary VELCRO sticky back square. The rod was then secured between the clamps, and the tensile strength required to peel trailing edge 138 of rolled food item 110 was recorded. The separation speed of the probe was set at 2 mm/sec.

For proper adhesion of trailing edge 138 of the strip of support material 16 and food 14 to the roll body, a minimum adhesive strength of 42 grams-force/cm$^2$, measured through the peel off test as described above, was required. An adhesive strength of 100 to 300 grams-force/cm$^2$ was found to be optimum. A water activity above 0.59 in deposit 144 gives proper adhesion of rolled food item 110. However, a water activity above 0.64 results in less tacky products. The optimal range therefore, is 0.59–0.64 water activity for food 14 after the application of the spray liquid.

It should be appreciated that after fabrication has been completed, the spray liquid within deposit 144 over time may decrease such as the result of evaporation or dispersion throughout the remaining portions of food 14 to be of an amount to reduce its tackiness, even to an amount which is insufficient to adhere food 14 to the strip of support material 16. However, the forces which would tend to unintentionally unroll rolled food item 110 is considerably less after fabrication. In fact after fabrication, reduction of tackiness may desirably increase the ease at which rolled food item 110 can be initially, intentionally unrolled by the consumer. Additionally, the evaporation and/or dispersion of the spray liquid from deposit 144 is also advantageous in the reduction of the possibility of the degradation of food 14 in deposit 144 as the result of the increased moisture content including but not limited to molding. In this regard, it-should be appreciated that if nozzles 142 were operated continuously or in a manner to spray substantial portions of the strip of food 14 and support material 16 in an amount to develop adhering tackiness, the shelf life of the resulting rolled food item could be significantly reduced to an extent which would make it unmarketable.

Rolled food item 110 according to the teachings of the present invention is advantageous over prior rolled food items. In particular, the strip of food 14 and support material 16 is contacted only by a spray and in particular is not mechanically contacted such as required during the application of labels. Further, in the most preferred form, only water is added and particularly no other food ingredient such as corn syrup is added which could affect the consistency, taste or appearance of food 14. Additionally, problems in the handling of corn syrup or like food additives including clogging additive passages and stickiness when contacting other surfaces and apparatus components including the cleaning thereof is avoided when water is utilized. In fact, existing fabrication equipment can be easily modified by the simple replacement of the labeler and associate label applying accessories or other fabrication unrolling prevention provisions with nozzles 142. In the preferred form with only water being sprayed, clogging and cleaning requirements of nozzles 142 are minimized in comparison to the problems associated with moving and cleaning corn, syrup or similar food adhesives. Additionally, the fabrication and inventory costs for labels as well as the capital costs associated with the fabrication and application of such labels are avoided. Thus, existing fabrication equipment and its operating conditions can be utilized without significant change and in many cases with more trouble free operation.

Now that the basic teachings of the present invention have been explained, many extensions and variations will be obvious to one having ordinary skill in the art. For example, although the operation of spray nozzles 142 is shown while the strip of food 14 and support material 16 is being rolled adjacent to its leading end 136, deposit 144 can be provided at any position upstream of roll-up section 76 including while the strip of food 14 and support material 16 is generally in a planar condition according to the teachings of the present invention. Similarly, although the operation of spray nozzles 142 is shown while the strip of food 14 and support material 16 is of its marketable length, deposit 144 can be sprayed on food 14 and support material 16 prior to cutting into multiple strips and/or cutting to length according to the teachings of the present invention when food 14 is continuously applied to continuous roll stock of support material 16.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Apparatus for fabricating a rolled food item, comprising, in combination: means for providing a strip of support material and food, with the strip of support material and food having a trailing edge and a leading edge, with the food having a tackiness; means for rolling the strip of support material and food into a roll having a periphery and a center, with the support material located on the outside of the roll, with the trailing edge located on the periphery of the roll and with the leading edge located adjacent the center of the roll; means for spraying a deposit of a source of moisture at least on the food adjacent to the trailing edge prior to its rolling into the roll, with the source of moisture increasing the tackiness of the food sufficient to be adherable to the support material in the roll to at least temporarily prevent unintentional unrolling of the roll.

2. The apparatus of claim 1 wherein the strip of support material and food has an elongated length between the trailing and leading edges; and wherein the deposit has a length considerably shorter than the elongated length of the strip of support material and food.

3. The apparatus of claim 2 wherein the strip of support material and food comprises the strip of support material having side edges and a strip of food having side edges spaced inwardly of the side edges of the strip of support material, with the leading and trailing edges of the strip of food being coextensive with the leading and trailing edges of the strip of support material, with the deposit having side edges spaced inwardly from the side edges of the strip of food and having a trailing edge coextensive with the trailing edge of the strip of food.

* * * * *